United States Patent [19]

Lynch et al.

[11] 4,231,777
[45] Nov. 4, 1980

[54] METHODS OF AND APPARATUS FOR HEATING A GLASS TUBE

[75] Inventors: Brian Lynch, Norcross; Fred P. Partus, Atlanta, both of Ga.

[73] Assignee: Western Electric Company, Inc., New York, N.Y.

[21] Appl. No.: 24,289

[22] Filed: Mar. 27, 1979

[51] Int. Cl.³ .................... C03B 23/04; C03B 37/025
[52] U.S. Cl. ............................................ 65/109; 65/2; 65/110; 65/120; 65/244; 65/271
[58] Field of Search ................ 65/2, 12, 13, 108, 109, 65/110, 120, 244, 271

[56] References Cited

U.S. PATENT DOCUMENTS

| | | | |
|---|---|---|---|
| 2,570,899 | 10/1951 | Wolf | 65/120 X |
| 3,652,248 | 3/1972 | Loxley et al. | 65/2 |
| 3,982,916 | 9/1976 | Miller | 65/18 X |
| 4,154,571 | 5/1979 | Pariani | 431/186 |
| 4,160,543 | 7/1979 | Dill et al. | 266/252 |

FOREIGN PATENT DOCUMENTS 133601 9/1901 Fed. Rep. of Germany ............ 65/108

Primary Examiner—Arthur D. Kellogg
Attorney, Agent, or Firm—E. W. Somers

[57] ABSTRACT

In order to react gases and/or vapors to deposit optically suitable layers of doped silicon dioxide on an inner wall of a glass substrate tube to produce a preform from which optical fibers are drawn, the glass tube is heated by a mixture of combustible gases. The combustible gases are directed along passageways in a housing of a torch assembly which confines a portion of the length of the tube and then out of the passageways to produce a flame that engages the confined portion of the length of the tube. The housing and walls that define ends of the passageways adjacent the tube are cooled to an extent which substantially eliminates oxidation of the material from which the housing and the walls of the passageways are constructed. The torch assembly provides a variable confinement of the tube, radially and longitudinally, which is effective to control the temperature profile produced at the surface of the tube as it is rotated about its longitudinal axis, and as the torch assembly is moved to heat successive portions of the length of the tube.

21 Claims, 21 Drawing Figures

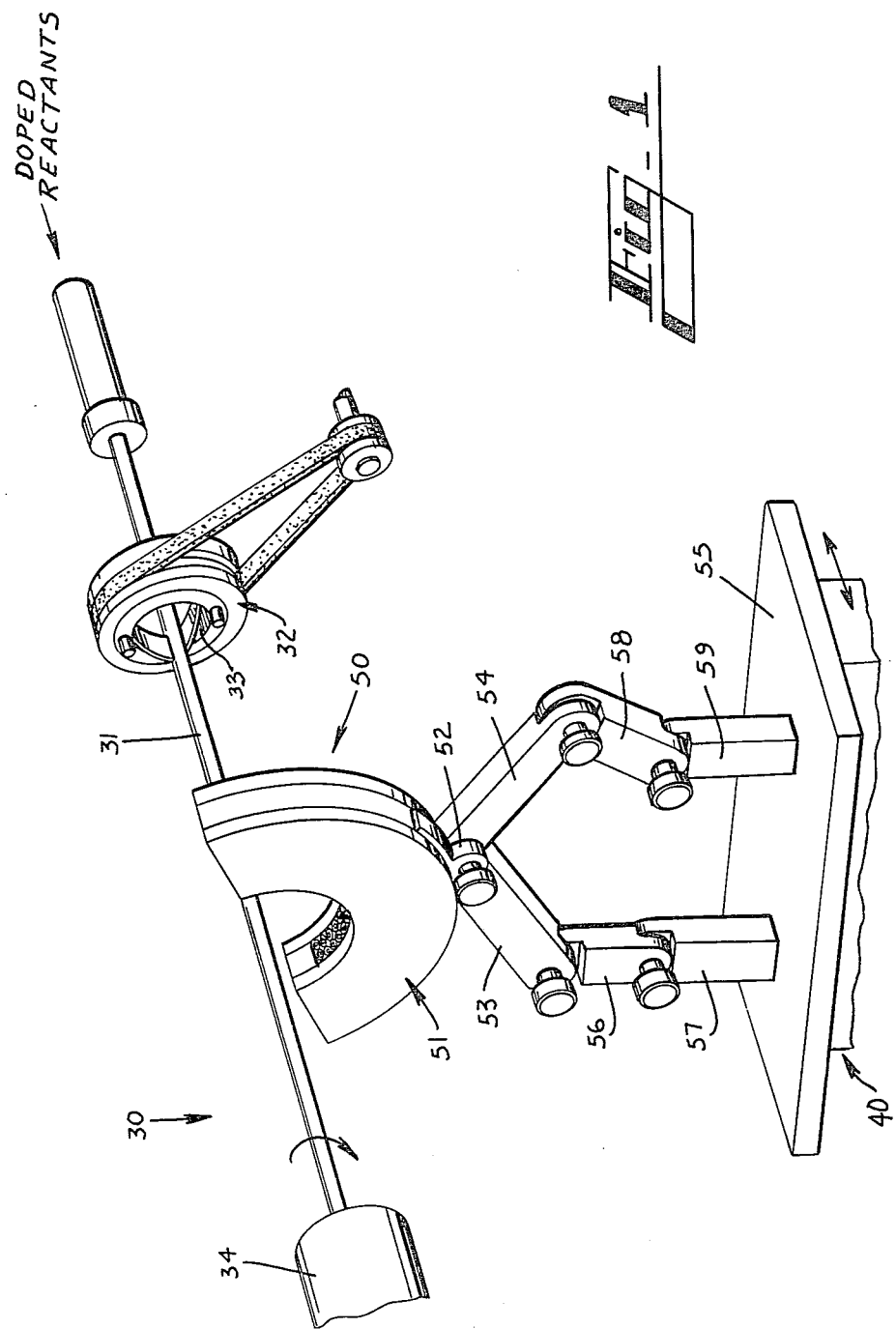

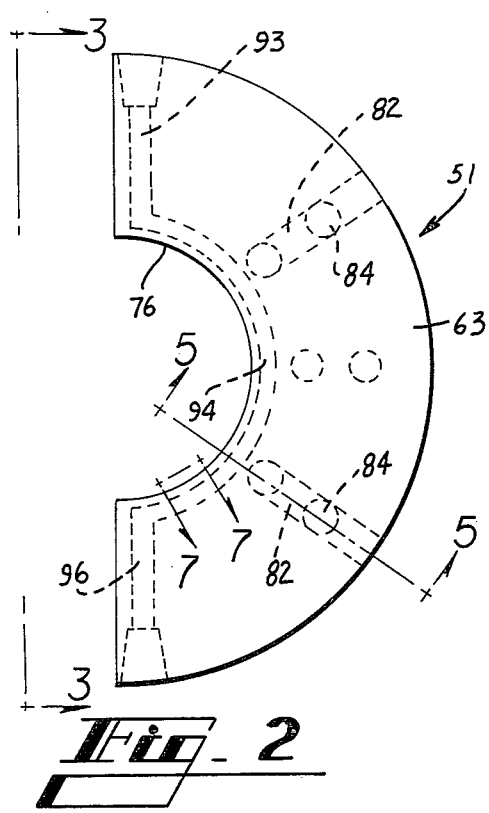
FIG_2
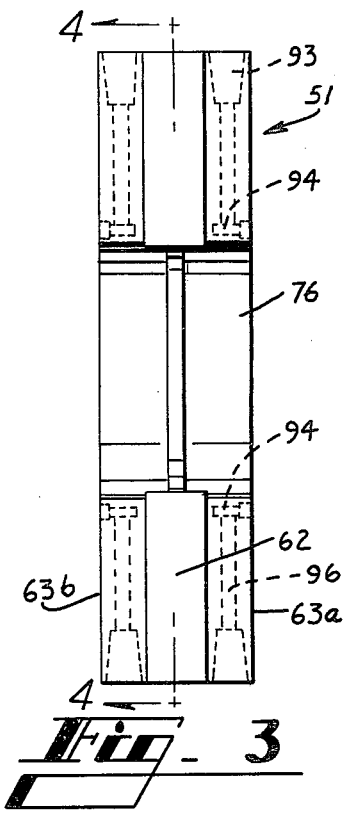
FIG_3
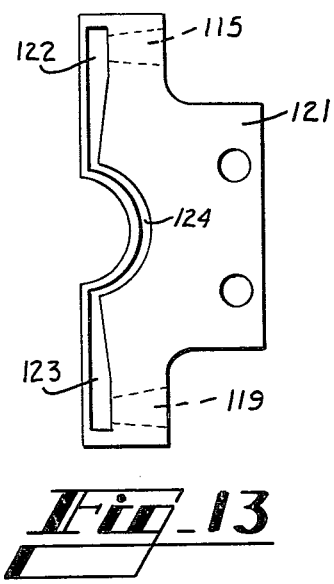
FIG_13
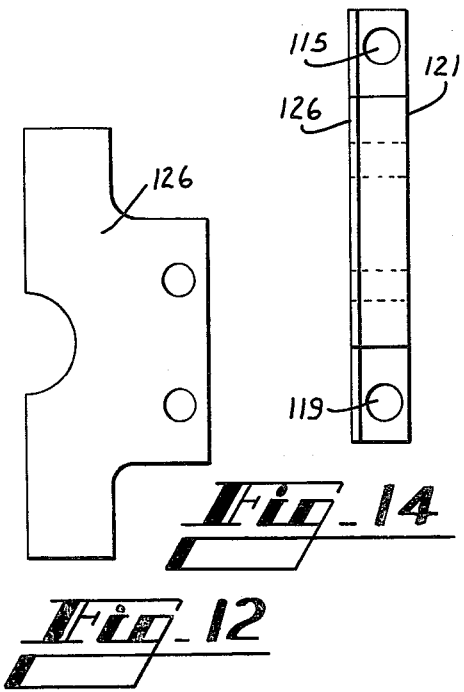
FIG_12 FIG_14

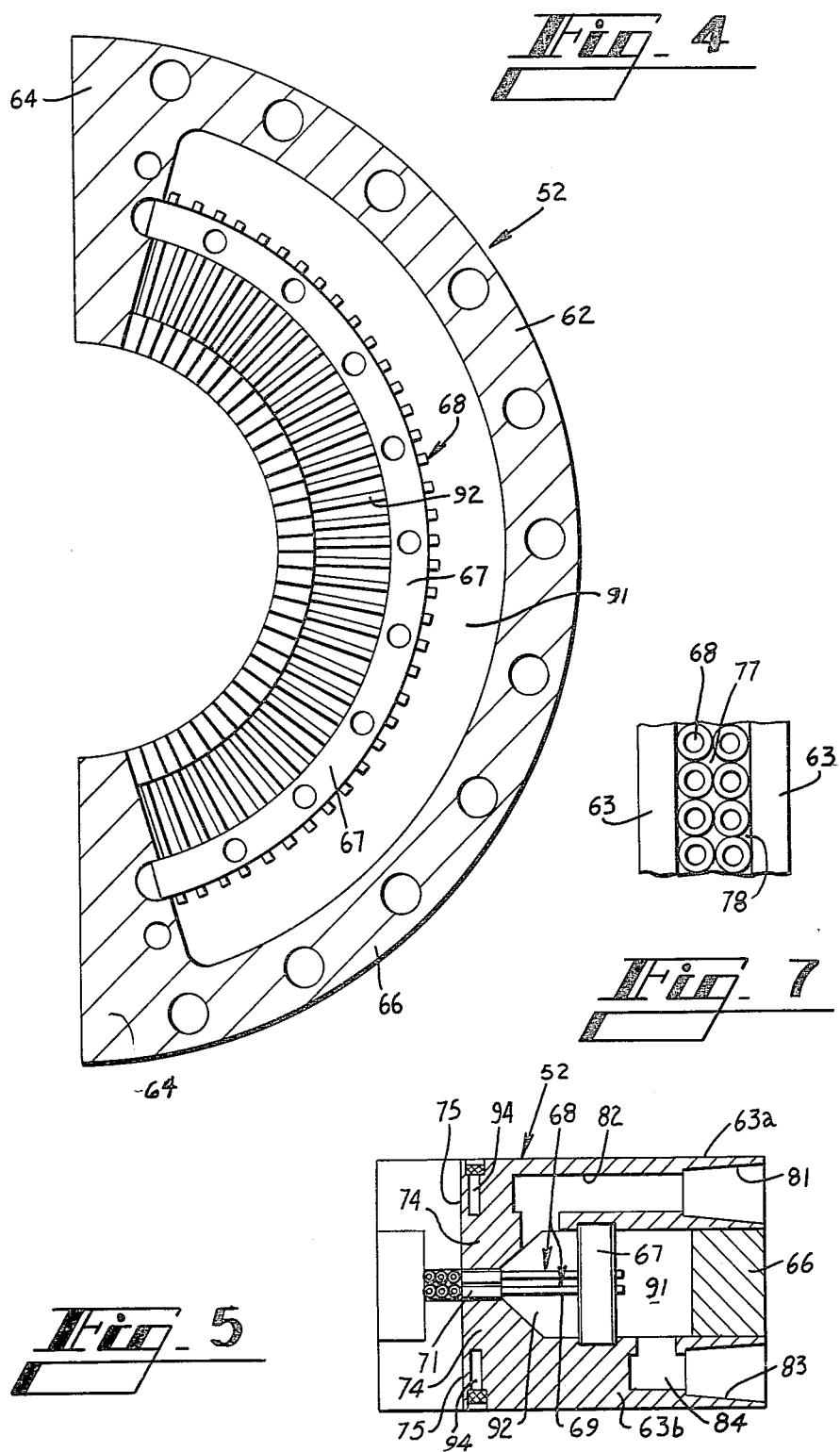

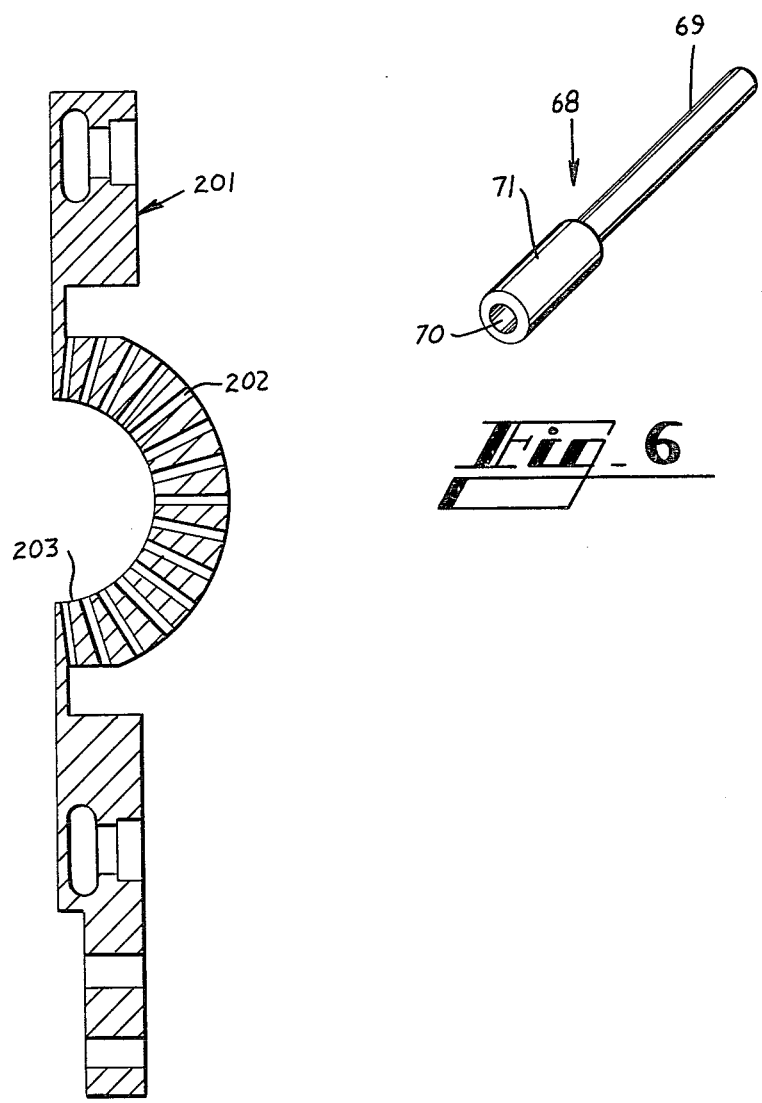

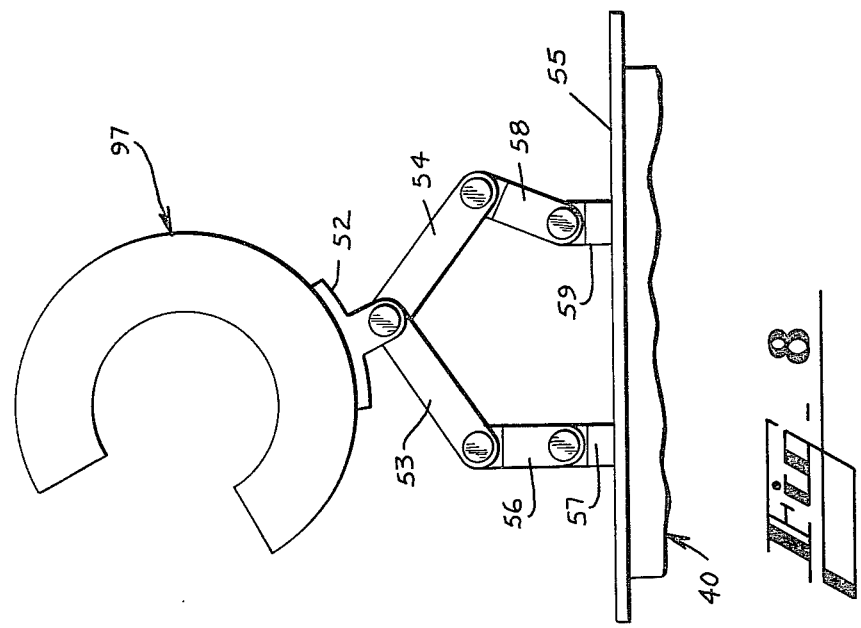
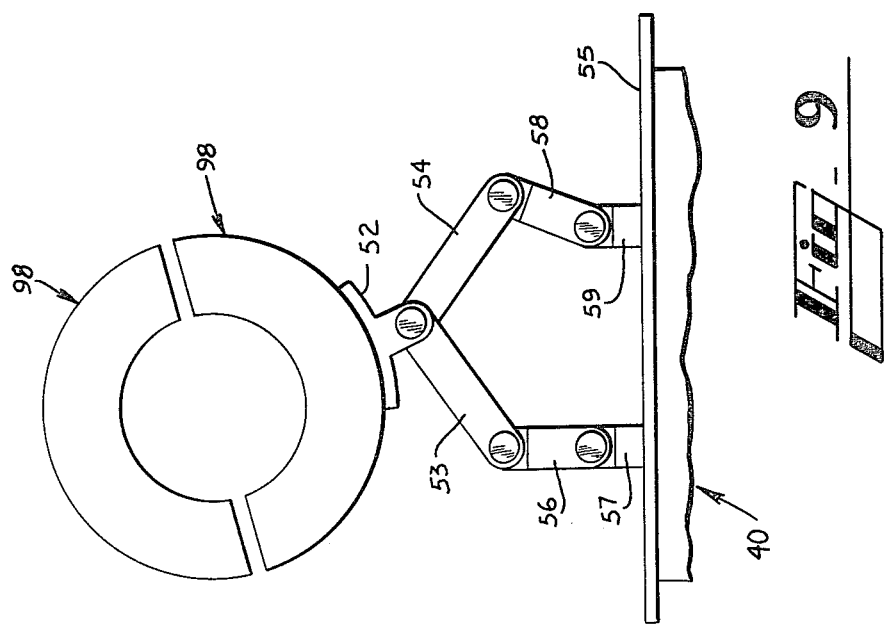

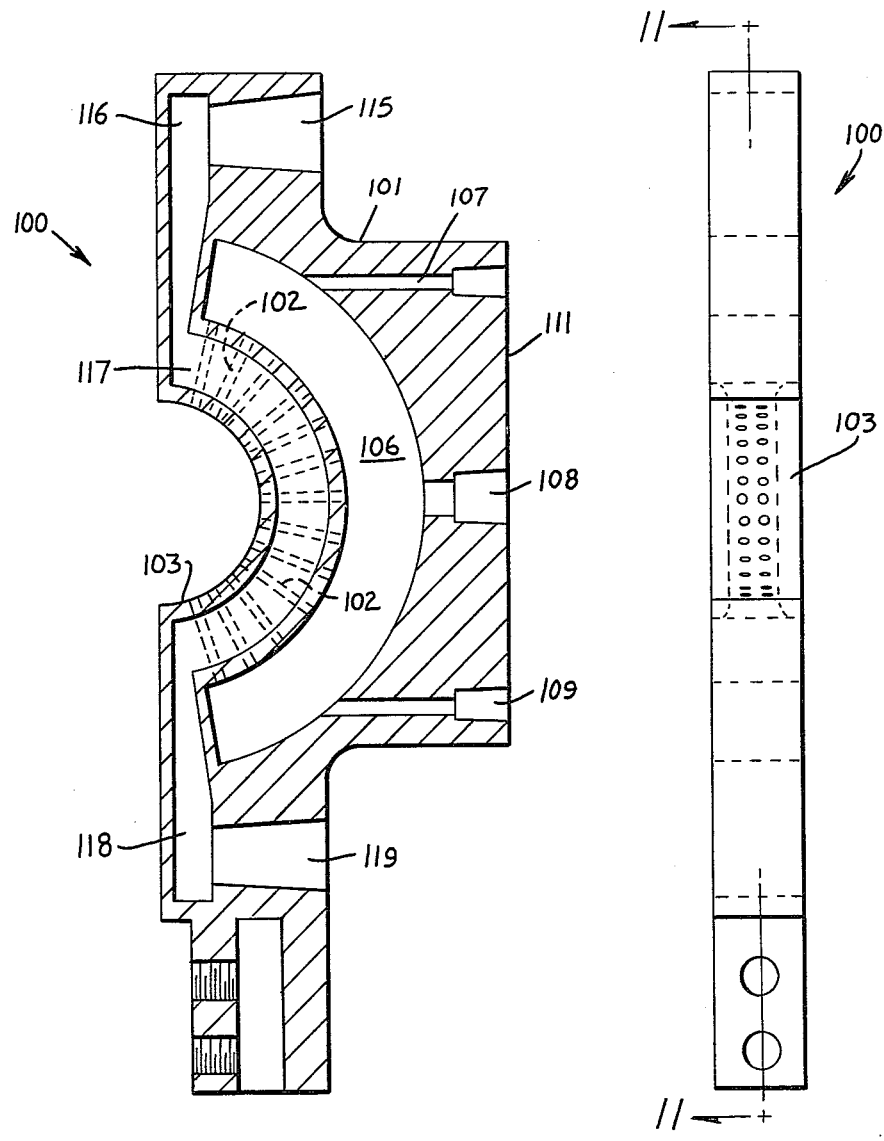

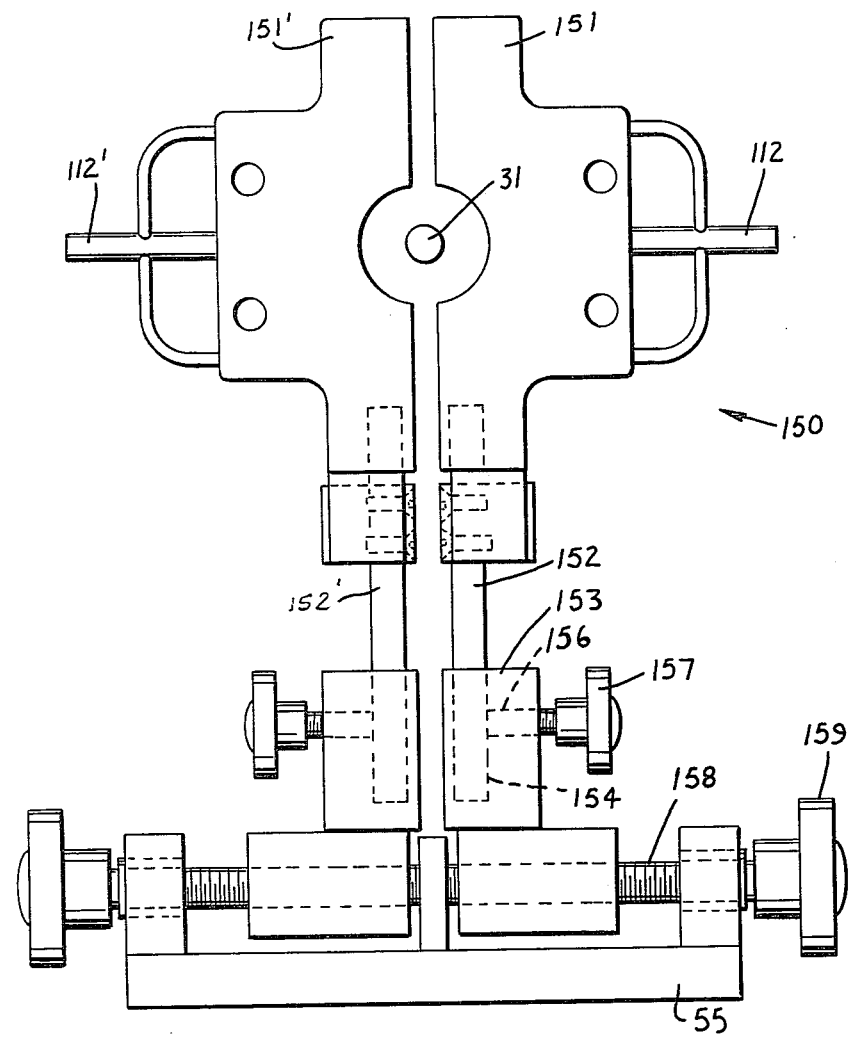
Fig_15
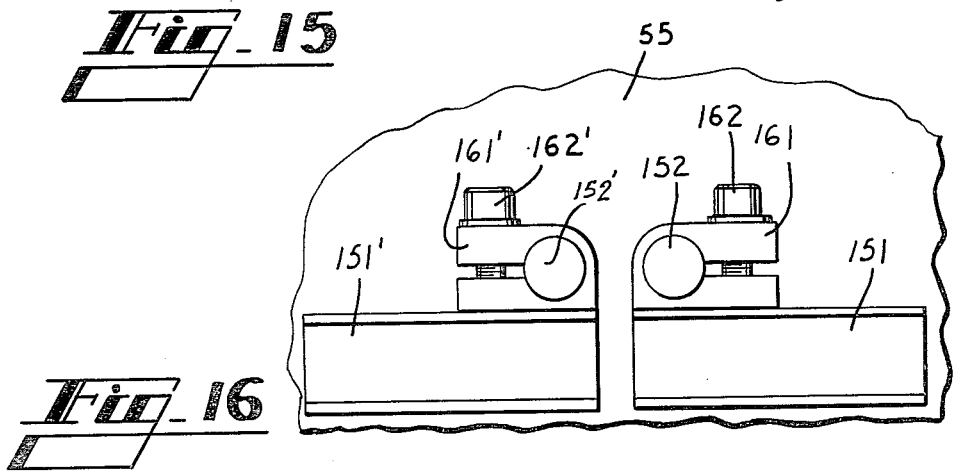
Fig_16

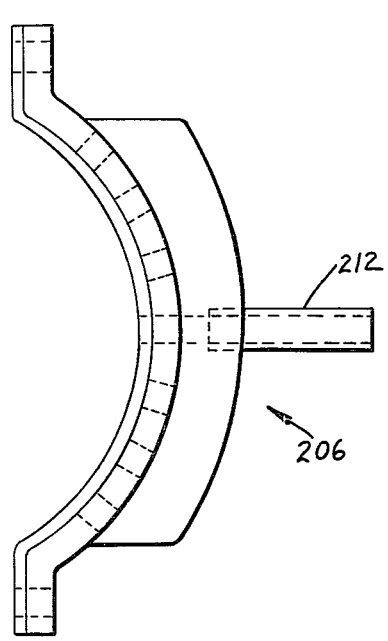
Fig_19
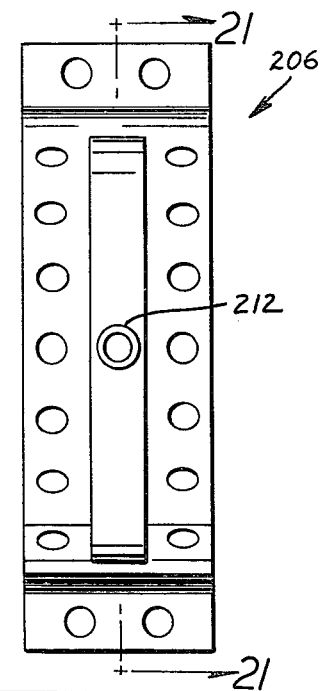
Fig_20
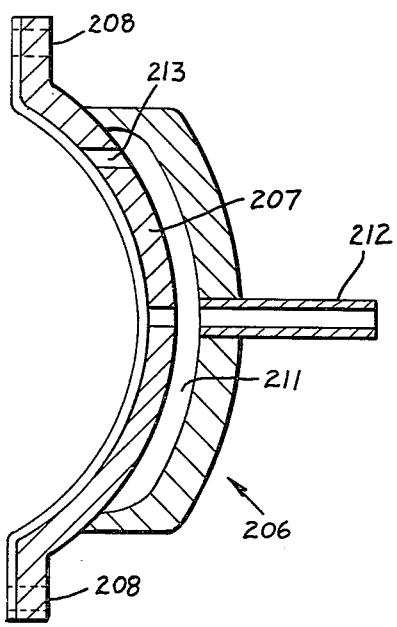
Fig_21
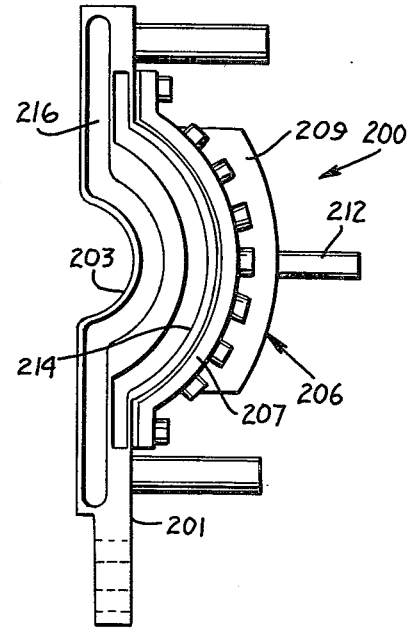
Fig_17

METHODS OF AND APPARATUS FOR HEATING A GLASS TUBE

TECHNICAL FIELD

This invention relates to methods of and apparatus for heating glass tubes used in the manufacture of fiber lightguides, and more particularly, to methods of and apparatus for the heating of glass tubes in order to facilitate the deposition of optically suitable layers within the tube to manufacture a preform from which fibers are drawn.

BACKGROUND OF THE INVENTION

In the manufacture of fiber lightguides for use in communications, there are several different techniques for producing an optical fiber, for example. One such technique comprises directing a constantly moving stream of gas phase reactants and oxygen through a glass substrate tube. The tube may be silicon dioxide ($SiO_2$), for example, and the reactant, silicon tetrachloride ($SiCl_4$). The oxygen stream will also carry dopants to produce the appropriate or desired index of refraction in the finished optical fiber. The substrate and the glass are heated to a reaction temperature within a moving hot zone traversing the outside of the tube, and the consequent reaction produces $SiO_2$ and dopants fused into a continuous layer on the inner wall of the tube within the hot zone.

Generally, the heating is accomplished by one or more gas nozzles which directs jets of burning gases onto the surface of the tube. See, for example, U.S. Pat. No. 3,982,916 issued Sept. 28, 1976 to S. E. Miller. A single nozzle, or preferably a plurality of nozzles surrounding the tube produce a temperature profile on the surface of the tube, and, hence, inside the tube, with a peak value sufficient to accomplish the desired reaction and deposition. As can be expected, the nozzles become extremely hot in operation, and, as a consequence, some of the material of the nozzles is oxidized and carried with the flame to the surface of the tube. Such a flame is commonly referred to as a "dirty" flame, and is to be avoided.

In those installations in which nozzles are directed toward the tube, there is a great deal of wasted heat and inefficiency, requiring greater amounts of combustible gases to achieve the desired temperatures. In addition, the flame is not confined, making a precise control of the temperature profile difficult. Efforts to increase efficiency have included mounting the nozzles in a ring-shaped housing which surrounds the tube and helps confine the heat to a zone or area of the tube. Such an arrangement is used in a process for drawing a glass tube into a rod and is shown, for example, in U.S. Pat. No. 3,652,248 of Loxley et al. Efforts to control the heating efficiency and temperature profile are successful for one set of parameters, among which are gas composition, gas velocity, and proximity of the nozzles to the tube. However, if any of these parameters are changed for an arrangement such as shown in the Loxley et al patent, for example, it is necessary to use a totally different housing structure. Furthermore, if attempts to vary the temperature profile include increasing the gas velocity or varying the constituent elements of the gases, damage to the tube, such as erosion of the outer surface, may result. Also, relatively high velocities cause extremely turbulent gas flows which are difficult to control.

SUMMARY OF THE INVENTION

The present invention comprises both methods of overcoming the aforementioned problems of the prior art, and apparatus for accomplishing this end.

The method of heating a glass substrate tube comprises directing a flow of combustible gases through a plurality of passageways contained in a housing and directed toward a tubular article. The housing and the ends of the passageways at least adjacent the tubular article are cooled to an extent sufficient to substantially eliminate degradation such as, for example, by oxidation or reduction, of the material forming the housing and passageways. The temperature profile produced at the surface of the tubular article is controlled by producing a variable confinement of the heat to a desired area of the tubular article while the tubular article is rotated and the tubular article and the torch are moved relative to each other to cause successive portions of the length of the tubular article to be heated.

The apparatus of the invention, in one form thereof, includes a torch assembly comprising a housing having a plurality of nozzles which are disposed radially of a rotatably supported glass substrate tube and opening to an arcuate surface of the housing which is spaced a predetermined distance from the tube to be heated. Each of the nozzles comprises one portion which is connected to a supply of a first combustible gas and another portion which is connected to a second combustible gas. The gases are directed through and around the nozzles and are mixed adjacent an arcuate surface of the housing within the vicinity of the tube as confined by the arcuate surface. A coolant is circulated through the torch assembly to cool the housing while the combustible gases themselves cool the nozzles with a secondary conductive cooling of the nozzles occuring due to the mounting of the nozzles within the cooling housing. The cooling of the housing and of the nozzles prevents oxidation thereof which could result in contamination of the tube. Relative motion is caused to occur between the tube and the torch assembly with the torch assembly preferably being moved along the tube. The confinement of the tube may be complete laterally such as by two semi-circular torch halves or partial with an annular segment. The tube is turned rotatably about its longitudinal axis as the torch assembly is moved therealong to produce a moving hot zone with a controlled temperature profile. In an alternative embodiment, the combustible gases are premixed prior to the flow thereof through the nozzles.

BRIEF DESCRIPTION OF THE DRAWINGS

Other features of the present invention will be more readily understood from the following detailed description of specific embodiments thereof when read in conjunction with the accompanying drawings, in which:

FIG. 1 is a perspective view of an apparatus of this invention which includes a torch assembly for heating a glass tube during a process in which the tube is manufactured into a preform for use in drawing fiber lightguides;

FIG. 2 is an elevational view of a surface mix torch assembly which includes a plurality of nozzles;

FIG. 3 is an end view of the torch assembly of FIG. 2 taken along lines 3—3;

FIG. 4 is an elevational view in section of the torch assembly shown in FIG. 3 and taken along lines 4—4 thereof;

FIG. 5 is a detailed view of a portion of the torch assembly shown in FIG. 2 and taken along lines 5—5 thereof and showing a plurality of nozzles;

FIG. 6 is an enlarged view in perspective of one of the nozzles which comprises the torch assembly in FIG. 5;

FIG. 7 is an end view of a portion of the torch assembly of FIG. 2 along lines 7—7 and showing two rows of the nozzles;

FIG. 8 is an alternate embodiment of the torch assembly of FIG. 2;

FIG. 9 is still another embodiment of a surface mix torch assembly;

FIG. 10 is an end view of a premix torch assembly without cover plates;

FIG. 11 is an elevational view in section view of the premix torch assembly shown in FIG. 10 and taken along lines 11—11;

FIG. 12 is an elevational view of a cover plate which will be assembled to each side of the center section of the premix torch assembly of FIG. 10;

FIG. 13 is an elevational view of a side plate which may be assembled with the center section of the premix torch assembly shown in FIG. 11 to extend to longitudinal confinement of the tube;

FIG. 14 is an end view of the side plate shown in FIG. 13 and the cover plate of FIG. 12 assembled thereto;

FIG. 15 is an elevational view looking along the centerline of a lathe and showing another embodiment of a premix torch assembly which is mounted on the lathe;

FIG. 16 is a plan view of the premix torch assembly shown in FIG. 15; and

FIGS. 17–21 are elevation and end views of still another embodiment of a premix torch assembly.

DETAILED DESCRIPTION

Referring now to FIG. 1 there is shown an apparatus, designated generally by the numeral 30, for heating a glass substrate tube 31 to manufacture a glass preform from which are drawn optical fibers. The heating of the tube 31 is required in order to cause the reaction products of gases and/or dopants being fed into the tube to be fused to the inside wall of the tube to provide an optically suitable profile for communications use.

The apparatus 30 generally comprises a lathe 32 having a headstock 33 and a tailstock 34 which are each driven off a common shaft (not shown) and which are used to support rotatably the glass starting tube 31. The lathe 32 also includes a carriage 40 which is mounted for reciprocal movement along the lathe. Mounted on the carriage 40 is a torch assembly which is adapted to cause a flow of combustible gases to produce a flame which is directed toward the tube 31 and to control a temperature profile produced at the surface of the tube by the burning gases by confining the heat from the burning gases to a desired surface area of the tube.

The torch assembly may be constructed to be either a surface mix unit or a premix unit. In a surface mix unit, each of two combustible gases is fed through the torch assembly and are mixed together within an enclosure which confines at least partially the tube 31 and within the confinement provided between the torch assembly and the tube. On the other hand, in the premix construction, the combustible gases are premixed prior to their flow through the torch assembly and into the vicinity of the confined tube 31.

As can best be seen in FIGS. 1 and 2, a torch assembly 50 of the preferred embodiment comprises a housing 51 in the form of an annular segment which in one embodiment may be semi-circular. The torch assembly 50 has a mounting bracket 52 attached thereto and which is pin-connected to two links 53 and 54. The link 53 is pin-connected to a link 56 which is pin-connected to a post 57. The link 54 is pin-connected to a link 58 which is pin-connected to a post 59 with the posts being attached to a base plate 55 that is supported by carriage 40. Suitable pins such as threaded pins having a turning knob are used for the connections of the links. One of the links at each connection point has a threaded hole while the other has a clearance hole so that when the pins are loosened, the links can turn relative to each other, and when tightened, relative motion between the links is prevented.

The mounting of the torch assembly 50 for movement relative to the centerline of the lathe 92 which extends between the headstock 33 and the tailstock 34 provides for variable confinement of the substrate tube 31. By releasing the pressure of the links on each other at the pin connections, the torch assembly 50 may be moved within any one of a range of distances from the tube 31 or to any one of a plurality of positions about and spaced from the tube. The variable confinement of the tube 31 is of help in the control of the temperature profile along successive portions of the tube 31 as the torch assembly moves reciprocally along the length of the rotating tube during a deposition mode in which the tube is collapsed into a rod preform.

It should be apparent that appropriate mounting of the torch assembly 50 may be made so that it can be canted to the axis of the substrate tube 31.

The configurationn of the torch assembly 50 is also such that it facilitates the initial mounting of the tube 31 in the lathe 32 to begin the deposition process. In some prior art heating units used for drawing, the elongate article being worked on extends through a furnace which completely encloses the tube in a radial direction. A torch assembly having a configuration such as that used in a drawing furnace of the aforementioned Loxley et al patent presents some problems if used for heating a glass tube 31 during the deposition process. Undue care would have to be exercised when attempting to mount a tube 31 in a lathe between the headstock 33 and tailstock 34 as opposed to its use in a drawing operation in which one end of the tube is easily insertable through the furnace toward an open, unobstructed lower work area.

In a preferred embodiment as shown in FIGS. 2–4, the housing 51 of the torch assembly 50 includes a center section 62 which is disposed between two cover plates 63a–63b. As can best be seen in FIG. 4, the center section 62 includes end walls 64—64, an arcuately configured rear wall 66 and an arcuately configured, internally disposed bridge wall 67. The bridge wall 67 is adapted to have a plurality of radially disposed gas nozzles 68—68 extending therethrough.

Referring now to FIG. 6, it can be seen that each of the nozzles 68—68 comprises a first portion 69 and a second portion 71 with the diameter of the first portion being substantially smaller than that of the second portion. A uniform diameter passageway 70 extends through the first and second portions 69 and 71 of each nozzle 68. The nozzles 68—68 are mounted in the center segment 62 so that an end portion of the small diameter portion of each extends through and is attached to the bridge wall 67 (see FIGS. 4 and 5). It should be observed that in the drawings, two rows of nozzles 68—68 are used (see FIG. 7), but it is within the scope of this invention at least insofar as the surface mix construction is concerned to use more or less rows depending on the desired temperature profile with a particular substrate tube 31.

In order to complete the torch assembly 50, the cover plates 63a-63b are attached to each side of the center segment. Each of the cover plates 63a-63b incudes a semi-annular lip 74 (see FIG. 5) which depends toward the nozzles 68—68 so that the nozzles are effectively clamped between the opposing lips. Outwardly facing circumferential surfaces 75—75 of the lips cooperate to form a composite arcuate surface 76 (see FIG. 2) which is effective to at least partially confine the tube 31. As can be seen in FIG. 7, the clamping of the large diameter portions 71-71 of the nozzles 68—68 forms openings 77—77 between the ends of the nozzles and openings 78—78 between the ends of the nozzles and the lips 74—74.

The cover plates 63a-63b are also effective to direct the combustible gases into the vicinity of the nozzles 68—68. As can be seen in FIGS. 2 and 5, one of the cover plates 63a includes a plurality of openings 81—81 and a plurality of tunnels 82—82 which communicate with a supply of hydrogen gas. The other one of the cover plates 63b includes a plurality of openings 83—83 that are connected externally to a supply of oxygen gas and that are connected internally to a plurality of associated tunnels 84—84.

When they are assembled together as shown in FIGS. 4 and 5, the cover plates 63a-63b cooperate with the center plate 62 to form an outer arcuate cavity 91 and an inner arcuately shaped cavity 92. The outer cavity 91 opens to the tunnels 84—84 so that the supply of oxygen flows into the cavity 91 and then into and through the passageways 70—70 of the nozzles 68—68 which are supported in the bridge wall 67. The bridge wall 67 functions to separate the two cavities 91 and 92 and to prevent any interaction between the two combustible gases in the cavities. The cavity 92 communicates with the tunnels 82—82 so that hydrogen flows into the cavity 92 and thence outwardly through the openings 77—77 (see FIG. 7) between the ends of the nozzles 68—68 and the openings 78—78 between the ends of the nozzles 68—68 and the lips 74—74 of the cover plates.

The nozzles 68—68 are sized so that the velocities of the combustible gases i.e., the hydrogen and the oxygen, can be scaled. By controlling the flow of the gases, a reducing or oxidizing flame can be produced, if desired. The velocities of hydrogen and oxygen are also influenced by the oustide diameter of the portions 71—71 of the nozzles 68—68 which affects the area of the openings 77—77 between the nozzles. The control of the ratio of the gases and velocities prevents excessive wear of the nozzle walls and of the substrate tube 31. On the other hand, the ratio can be controlled to abrade, if so desired, the outer surface of the substrate tube 31 to provide a desired core-to-clad ratio which is defined as the thickness of the tube to that of the deposited layers.

In the torch assembly 50, the oxygen and the hydrogen are moved through and about the nozzles 68—68 and are mixed generally along the arcuate surface 76 to produce a flame which impinges on the tube 31. The flows which are emitted to the surface 76 result in a flame which provides a temperature profile that is sufficient to facilitate the deposition of doped silicon dioxide and deposits on the inner surface of the tube 31. The configuration of the torch assembly 50 is such as to produce a heating zone with temperatures in the range of about 1800° C.

One advantage of the surface mix torch assembly is its ability to produce a so-called "soft" flame which reduces the impact of the gases on the tube and avoides abrasion of the tube surface.

It is important that the housing 51 and the walls of the nozzles 68—68 are cooled in order to provide a clean gas which prevents oxidation and resulting flaking of the material of which the housing and the walls are made. In order to accomplish this in the torch assembly 50, a coolant, such as chilled water, for example, is fed into each of two conduits 93—93 (see FIGS. 2 and 3) which are formed in the cover plates 63a-63b. The coolant is directed along the conduits 93—93 and through two semi-annular channels 94—94 (see also FIG. 5) which are formed in the cover plates 63a-63b adjacent the lips 74—74 which clamp the nozzles 68—68. From the channels 94—94, the coolant moves into exit conduits 96—96 and out of the assembly 50 to a drain (not shown) for recirculation. The coolant is effective to cool the housing 51 and, because of the mounting of the nozzles 68—68 within the housing to cause a secondary cooling, by conduction, of the nozzles. The nozzles 68—68 are primarily cooled by the combustible gases flowing through the nozzles and through the passageways 77—77 and 78—78. The cooling of the housing 91 and of the nozzles 68—68 prevents oxidation of portions of the housing and of the nozzles which otherwise could result in minute particles of oxidized metal being carried along in the gaseous streams and contaminating the substrate tube 31. The coolant is also effective to maintain the temperature of the torch assembly 50 within the range of 25° C. to 30° C. to permit any necessary manual adjustments thereof during operation and to prevent undue thermal stresses within the apparatus.

It should be apparent that while the preferred embodiment includes a semi-annular housing 51 such as that shown in FIG. 1, other embodiments of a surface mix torch assembly are within the scope of this invention. For example, as shown in FIG. 8, a housing 97 which encloses a portion greater than 180° of the glass tube may be used, or a pair of semi-circular segment halves 98—98 (see FIG. 9) may be assembled together to provide a substantially complete lateral enclosure of a portion of the length of the tube.

Unlike the prior art, the torch assembly 50 in accordance with this invention is able to provide broad or narrow heat zones and variable confinement of a glass substrate tube 31 to obtain a desired temperature profile. The ability to control the temperature profile makes the torch assembly of this invention suitable for collapsing the tube 31 into a rod preform following the deposition process in which this invention has particular utility. The collapse of the tube 31 into the rod is accomplished by essentially symmetric heating of the tube and by depending on uniform surface tension induced by the heat in order to cause the tube to enter a collapse mode. Anything less than a substantially perfect heat distribution during the collapse mode will result in a sag in the tube 31 or a tube having an elliptical rather than a circular cross-section. While furnaces are available for drawing tubes into rods or for drawing large diameter tubes into small diameter tubes, the drawing is accomplished by the introduction of tension into the tube.

In an alternate embodiment, a torch assembly in accordance with this invention and designated generally by the numeral 100 (see FIGS. 10–11) is arranged so that combustible gases are premixed prior to their flow into the confining enclosure about the tube 31. The premix torch assembly 100 includes a center section or housing 101 which in one embodiment is substantially semi-annular in configuration and which includes plurality of radially disposed passageways 102—102 which open to an arcuate surface 103 of the housing. Each of the passageways 102—102 extends rearwardly to a gas cavity 106 which is connected through three passageways 107, 108 and 109 to a rear face 111 of the housing 101. The passageways 107, 108 and 109 are manifolded exteriorly of the housing 101 and connected through a single pipe or tube 112 to a mixing box (not shown) into which hydrogen and oxygen gases are fed and premixed for subsequent delivery through the passageways to form a flame which impinges on the tube 31. The manifolding of the premixed gas so that it enters the housing 101 through the separate ports distributes the gas so that it is not concentrated in the centermost passageways 102—102.

As in the torch assembly 50, the torch assembly 100 must include provisions for cooling the walls of the housing which define at least the exit ends of the passageways 102—102 in order to prevent oxidation. The housing 101 includes an entrance conduit 115 that is connected to a supply of coolant and then into a cavity 116 and then divides into two arcuately formed channels 117—117 adjacent the exit ends of the radially disposed passageways 102—102. The coolant flows along the channels 117—117 and then into a common cavity 118 and thence into a conduit 119 from which the spent coolant is collected and recirculated.

The torch assembly 100 also includes a pair of cover plates 126—126 (see FIGS. 12 and 14) which are assembled to opposite sides of the housing 101. The cover plates 126—126 are effective to enclose the cavity 106 and the passageways 107, 108 and 109.

While in the suface mix unit 50, the temperature profile may be lengthened by constructing the assembly with more than one row of nozzles 68—68, the torch assembly 100 is provided with such a capability by assembling extensions to outside faces of the housing 101. In order to accomplish this, the premix torch assembly 100 may also include one or more extension side plates 121—121 (see FIG. 13) which are assembled to the housing 101. Each side plate 121 includes entrance and exit grooves 122 and 123 which cooperate with the entrance and exit conduits 116 and 118, respectively, in the center section 101. Also, each side plate 121 includes an arcutately shaped groove 124 which cooperates with the channel 117 in the housing 101 to complete a flow path for the coolant. One or more of the assemblies may be operated selectively depending on the tube 31 being worked on and the temperature profile desired.

One advantage of the premix torch assembly 100 is that more than two combustible gases or two combustible gases together with other ingredients such as, for example, acetylene or propane could be premixed to provide increased heat capacity.

As with the torch assembly 50, the torch assembly 100 may include an annular segment, semi-circular or greater in periphery, or two halves assembled together.

Referring now to FIG. 15, there is shown a premix assembly, designated generally by the numeral 150, which includes two halves 151-151' of substantially identical construction with each of the halves enclosing a semi-circular portion of the tube 31 which is to be made into a preform. Each halve 151-151' is mounted on a post 152 which is supported vertically in a block 153 and held securely in a bore 154 therein by a threaded pin 156 that is turned by a knob 157. Each of the blocks 153—153 is attached to a threaded rod 158 which may be turned by a hand knob 159.

The mounting of the halves 151-151' for movement relative to the centerline of the lathe provides for variable confinement of the tube 31. By turning one or both of the knobs 159—159, the halves 151-151' of the torch assembly 150 may be moved closer toward the tube 31 or spaced further therefrom in order to control the heating of the tube and the deposition of the silicon dioxide and dopants internally thereof.

The arrangement of the premix or the surface mix torch assembly in two halves as hereinbefore described also facilitates the initial mounting of the tube 31 in the lathe at the outset. After a tube 31 has been mounted in the headstock 33 and the tailstock 34, with the halves 151-151' in an open position, the knobs 159—159 are turned to close the halves on each other to substantially confine the substrate tube.

Another feature of the arrangement of a torch assembly 150 comprising two halves 151-151' as shown in FIG. 16 resides in the pivotal mounting of the halves. As can be seen, the halves 151-151' are mounted on the posts 152-152' through bifurcated clamping blocks 161-161' and bolts 162-162'. By loosening the bolts 162-162', the halves 151-151' may be turned with respect to the tube 31 in order to provide a "leading" of the heat on the tube 31.

The distance between the arcuate curved surface 76 of the surface mix torch assembly 50 or 103 of the premix torch assembly 100 to which the nozzles 68—68 or passageways 102—102 open, is spaced generally in the range of about 0.5 to 2 cm. For example, in the surface mix torch assembly 50, that distance is about 0.5 to 2 cm; in the premix unit, the distance is in the range of 1 to 2 cm. It should be understood that these distances may also vary as between the deposition portion of the preform manufacture and that portion of the process during which the tube 31 is collapsed into a solid rod from which the fiber lightguides are drawn.

The temperature profile is controlled in order to obtain an optically suitable profiling of the silicon dioxide and dopants which are deposited on the inner wall of the tube 31. This control may be accomplished by (a) constructing the torch assembly to include one or more rows of nozzles or passageways or assembling units side-by-side, (b) changing the velocities of the gases and/or (c) varying the distance from the housing segments to the tube 31. The disposition of the gas jets about the tube 31 together with the rotation of the tube 31 results in a symmetric heating of the tube.

As will be recalled, the deposition process is followed by the step of collapsing the substrate tube 31 and deposited layers to form a preform from which fiber lightguides are to be drawn in a process described for example in copending, commonly assigned application Ser. No. 892,223, filed Mar. 31, 1978 in the name of F. P. Partus. It has been found that the premix torch assembly 100 may be ideal for this purpose because of its narrow heat zone. Because of this, fewer passes of the carriage are required thereby reducing the time necessary to cause the collapse. For example, depending on the diameter of the tube 31, and its wall thickness, it has been found that the premix torch assembly of this invention can collapse a tube at a rate in the range of about 2 to 35 mm/minute.

On the other hand, in order to prevent flashback of the premixed gas, its velocity must exceed that of flame propogation. This reduces somewhat the ability of the premix torch assembly 100 to produce a "soft" flame. For this reason, it may be expedient to heat the tube 31 during deposition with a surface mix torch assembly 50 and subsequently to use a premix torch assembly 100 positioned at one end of the lathe 32 and idle during deposition to collapse the tube. Ideally, the collapse is caused to occur in one pass of the torch assembly. The surface mix torch is also suitable for the collapse made because of its gentle flame. This allows surface tension only to cause the collapse of the tube 31. On the other hand, because of the relatively higher velocities in the premix torch assembly 100, the collapse is caused by surface tension and stagnation pressures.

Referring now to FIGS. 17 to 21, there is shown another embodiment of a premix torch in accordance with this invention and designated generally by the numeral 200. The torch assembly 200 includes a center section 201 which includes a plurality of radially disposed passageways 202—202 that open to an arcuate surface 203.

A header 206 (see FIGS. 19-21) is adapted to be assembled to the center section 201 as shown in FIG. 17 and includes an arcuately configured inner wall 207 having oppositely extending ears 208—208 through which bolts extend to connect the header to the center section. An outer wall 209 is connected to the inner wall 207 but spaced therefrom to form a manifold 211 which is fed by a supply pipe 212 that extends through the outer wall. The premixed gas which enters the manifold cavity is distributed therein and flows through these spaced entrance ports 213—213 into a cavity 214 to which the inner ends of the passageways 202—202 open.

The torch assembly 200 also includes provisions for cooling at least the walls of the center section 201 which define the outer walls of the passageways 201—201. A coolant is flowed into one end of the center section 201, splits and flows through each of two channels 216—216 which are disposed on opposite sides of the outer ends of the passageways to cool the walls thereof. The torch assembly 200 is constructed so that it may be assembled or disassembled quickly in the first instance or for cleaning purposes.

While the cooling disclosed hereinbefore is believed to prevent any oxidation of the material which comprises the torch housing or walls of the passageways or nozzles, it may also be effective to prevent reduction of any oxidized material which if not prevented could result in flaking and contamination of the tube 31. However, it has been found that any reduction is negligible as compared to oxidation which could occur in this environment. Moreover, it may be possible to reduce the probability of oxidation by constructing the housing and nozzles from a material such as stainless steel which oxidizes at relatively high temperatures.

The heating of the glass tube 31 is carried out while gas phase reactants are delivered to the glass tube. A system is disclosed in copending commonly assigned application Ser. No. 967,806 filed Dec. 8, 1978 in the name of F. P. Partus.

It is to be understood that the above-described arrangements are simply illlustrative of the invention. Other arrangements which include for example the interchange of the hydrogen and oxygen gases in the surface mix torch assembly 50, for example, may be devised by those skilled in the art which will embody the principles of the invention and fall within the spirit and scope thereof.

What is claimed is:

1. A method of heating a glass tube, said method comprising the steps of:
   heating an outer surface of the tube by directing a flow of combustible gases through a plurality of passageways in a housing toward a portion of the length of said tube;
   cooling at least those portions of the housing and the walls that define end portions of the passageways which are adjacent the tube and from which the combustible gases exit without cooling said tube, said cooling being sufficient to inhibit degradation of the material forming said housing and said walls, and to thereby prevent contamination of the tube;
   controlling the temperature profile along said portion of the length of said tube which includes providing a variable confinement of the heat to said portion of the length of the tube; and
   causing relative motion between the tube and the housing along the tube to cause successive portions of the length of the tube to be heated while rotating said tube about an axis which extends along the length of the tube.

2. The method of claim 1, wherein the housing is cooled by a coolant which is circulated through said housing adjacent said end portions of the passageways while said walls of said passageways are cooled by the gases which are flowed therethrough and which are at a temperature sufficient to cool said passageways, said walls being further cooled conductively by the cooled housing.

3. A method of heating successive portions of a glass tube while controlling the temperature profile along said tube, said method comprising the steps of:
   rotatably supporting a glass tube;
   confining a portion of the length of the tube at least partially with an arcuate surface of a housing which is spaced from the tube;
   mounting said housing so that said surface may be moved toward or away from said tube;
   directing a plurality of combustible gas flows through a plurality of passageways which extend through said housing and open to said arcuate surface;
   cooling at least those portions of the housing and walls which define the passageways adjacent to said arcuate surface to prevent oxidation thereof without cooling said tube; and
   moving the housing reciprocally along the length of the tube to cause a heating of successive portions of the length of the tube while rotating the tube about its longitudinal axis; and
   spacing said surface a predetermined distance from the tube to control the temperature profile along each successive portion of the length of the tube.

4. The method of heating successive portions of a length of a glass tube as set forth in claim 3, wherein a first combustible gas is premixed with a second combustible gas prior to the gas flows being directed through said passageways.

5. The method of claim 3, which also includes assembling a plurality of arcuate surfaces contiguous one another along the length of the tube and mounting the surfaces for selective individual movement toward or away from the tube.

6. The method of claim 3, which also includes mounting said passageways so that they may be disposed at an angle to the longitudinal axis of said tube.

7. A method of heating successive portions of a length of glass tube, said method comprising the steps of:
  rotatably supporting a glass tube along an axis which extends along the length of the tube;
  enclosing at least partially a portion of the length of the tube with an arcuate surface of a housing, said surface being spaced from the tube a predetermined distance;
  mounting said surface so that the distance between it and the tube is capable of being varied;
  directing a flow of a first combustible gas through each of a plurality of nozzles which are mounted in said housing and which open to said surface;
  directing a flow of a second combustible gas between said plurality of nozzles to mix with said first combustible gas along said arcuate surface to produce a flame which heats said tube;
  cooling the housing and walls of the nozzles at least adjacent the arcuate surface to prevent oxidation of the material forming the housing and the nozzles without cooling said tube;
  moving the arcuate surface reciprocally along the rod to cause a heating of successive portions of the length of the tube while rotating the glass tube; and
  spacing the surface a predetermined distance from the tube to control the temperature profile along each successive portion of the length of the tube.

8. The method of claim 7, which also includes the step of scaling the gas flows in and about the nozzles to further control the temperature profile along successive portions of the length of the tube.

9. The method of claim 7, wherein the housing is cooled by circulating a coolant therethrough and the walls of the nozzles are cooled by said first combustible gas flowing therethrough and by the second combustible gas flowing along outside surfaces of the nozzles and by the cooled housing.

10. An apparatus for heating a glass tube, which includes:
  means for supporting a tube for rotation about its longitudinal axis;
  means for including a plurality of passageways for directing a flow of combustible gases toward said tube;
  means for cooling at least those portions of the passageways which are adjacent the tube to inhibit contamination of the passageways and thereby prevent contamination of the tube;
  means for providing a variable confinement of the heat to said portion of the length of the tube to control the temperature profile along said portion of the length of said tube, said means for providing a variable confinement including an arcuate surface spaced equidistantly from the tube for confining at least partially the tube, said means for controlling the temperature profile including means for mounting the arcuate surface for movement toward or away from the tube;
  means for causing relative motion between the tube and the confining means along the tube to cause successive portions of the length of the tube to be heated; and
  means for rotating the tube about an axis which extends along the length of the tube.

11. The apparatus of claim 10, wherein the means for causing relative motion between the tube and the means for providing a variable confinement includes means for moving the means for providing a variable confinement reciprocally along the length of the tube.

12. The apparatus of claim 10, wherein the annular segment has an arc which is greater than 180° but less than 360°.

13. The apparatus of claim 10, wherein the annular segment is semicircular.

14. The apparatus of claim 10, wherein the means for providing a variable confinement includes two semicircular segments which substantially confine circumferentially a portion of the length of the tube.

15. The apparatus of claim 10, wherein said means for directing a flow of combustible gases toward said tube includes a plurality of nozzles which are mounted in a housing that includes said arcuate surface and disposed radially of the tube, said nozzles opening to said arcuate surface, and wherein a first combustible gas is flowed through each of said nozzles and a second combustible gas is flowed between said nozzles and walls of said housing.

16. The apparatus of claim 10 wherein the
  means for providing a variable confinement includes a housing which comprises an annular segment having a center section and two cover plates, said center section having an arcuate rear wall extending between two end portions and a bridge wall spaced from said rear wall and extending between said end portions, the assembly of the cover plates and the center section forming a first cavity between said rear wall and said bridge wall, one of said cover plates including a depending annular lip and a conduit extending between a rear wall thereof and said bridge wall and opening to said first cavity, said housing further including a plurality of radially disposed nozzles each having one end extending through and supported in said bridge wall and another end opening to said arcuate surface, the opposing depending lips engaging said nozzles to clamp said nozzles within said housing, and wherein a first combustible gas is flowed through each of said nozzles and a second combustible gas is flowed between the nozzles and said lips, said first and second combustible gases mixing and producing a flame adjacent said arcuate surface.

17. The apparatus of claim 16, wherein the nozzles are arranged in two rows.

18. The apparatus of claim 16, wherein the cooling means includes an entrance conduit for a coolant, an arcuately extending channel in each of said cover plates adjacent the other ends of the nozzles and adjacent the arcuate surface and a coolant exit conduit, said exit and entrance conduits communicating with said arcuately extending channels, and said cooling means further including means for causing a coolant to be circulated through said conduits and said channels to cool said housing and to cool conductively said nozzles which are supported between said depending lips and said bridge wall, said nozzles cooled by said gases flowing therethrough and therepast.

19. The apparatus of claim 10, wherein the means for providing a variable confinement includes a housing which includes a center segment in which are disposed said plurality of radially disposed passageways, said passageways opening to said arcuate surface adjacent the tube, and an arcuately configured chamber into which premixed combustible gases are fed from a supply.

20. The apparatus of claim 19, wherein a predetermined plurality of individually moveable center segments are assembled together along the length of the tube.

21. The apparatus of claim 10 which also includes means for mounting the confining means so that the passageways can be angled to the axis of said tube.

* * * * *